(12) United States Patent
Soderberg et al.

(10) Patent No.: US 7,212,140 B2
(45) Date of Patent: May 1, 2007

(54) PHOTONIC ANALOG-TO-DIGITAL CONVERTERS USING PHOTONIC CRYSTALS

(75) Inventors: John Jesse Soderberg, Acworth, GA (US); Kelvin Ma, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 754 days.

(21) Appl. No.: 10/304,214

(22) Filed: Nov. 26, 2002

(65) Prior Publication Data

US 2006/0097900 A1    May 11, 2006

(51) Int. Cl.
    *H03M 1/00* (2006.01)
(52) U.S. Cl. ..................... 341/137; 341/155
(58) Field of Classification Search ............ 341/137, 341/155; 359/139, 158, 237; 369/47.33; 385/18, 37
    See application file for complete search history.

(56) References Cited

U.S. PATENT DOCUMENTS

| | | | | |
|---|---|---|---|---|
| 6,160,504 | A | 12/2000 | Carillo et al. | 341/137 |
| 6,326,910 | B1* | 12/2001 | Hayduk et al. | 341/137 |
| 6,420,985 | B1* | 7/2002 | Toughlian et al. | 341/137 |
| 6,700,517 | B1* | 3/2004 | Kellar | 341/137 |
| 6,810,165 | B2* | 10/2004 | Golub et al. | 385/18 |
| 6,832,033 | B2* | 12/2004 | Prather et al. | 385/129 |
| 6,947,639 | B2* | 9/2005 | Singh et al. | 385/37 |

FOREIGN PATENT DOCUMENTS

EP    1 548 467 A1    6/2005

OTHER PUBLICATIONS

Bayindir, et al., "Photonic-crystal-based beam splitters," *Applied Physics Letters*, 77(24):3902-3904 (Dec. 11, 2000).
Brzozowski, et al., "Nonlinear Disordered Media for Broad-Band Optical Limiting," *IEEE Journal of Quantum Electronics*, 36(11):1237-1242 (Nov. 2000).
Loncar, et al., "Waveguidling in planar photonic crystals," *Applied Physics Letters*, 77(13):1937-1939 (Sep. 25, 2000).
A. Chutinan, et al., 'Highly confined waveguides as waveguide bends in three-dimensional photonic crystal,' *Appl. Phys. Lett.*, vol. 75(24), pp. 3739-3741 (1999), no month.
S. Fan, et al., 'Waveguide branches in photonic crystals,' *J. Opt. Soc. Am. B.*, vol. 18(2), 162-165 (2001), no month.
Brzozowski, et al., " All-Optical Analog-to-Digital Converters, Hardlimiters, and Logic Gates," *Journal of Lightwave Technology*, 19(1):114-119 (2001), no month.
Manolatou, et al., "High-Density Integrated Optics," *Journal of Lightwave Technology*, 17(9):1682-1692 (1999), no month.
Yonekura, et al., "Analysis of Finite 2-D Photonic Crystals of Columns and Lightwave Devices Using the Scattering Matrix Method," *Journal of Lightwave Technology*, 17(8):1500-1508(1999), no month.

* cited by examiner

*Primary Examiner*—Peguy JeanPierre
(74) *Attorney, Agent, or Firm*—Kilpatrick Stockton LLP

(57) ABSTRACT

A system and method for quantizing a photonic signal involves passing the photonic signal through a photonic crystal. The photonic crystal has localized defects for splitting the photonic signal into a plurality of quantized photonic components and for directing the quantized photonic components to a set of optical detectors. A digital conversion of the photonic signal can occur by performing a threshold comparison of the quantized components, either in the electrical domain through comparators or in the optical domain through optical limiters.

17 Claims, 4 Drawing Sheets

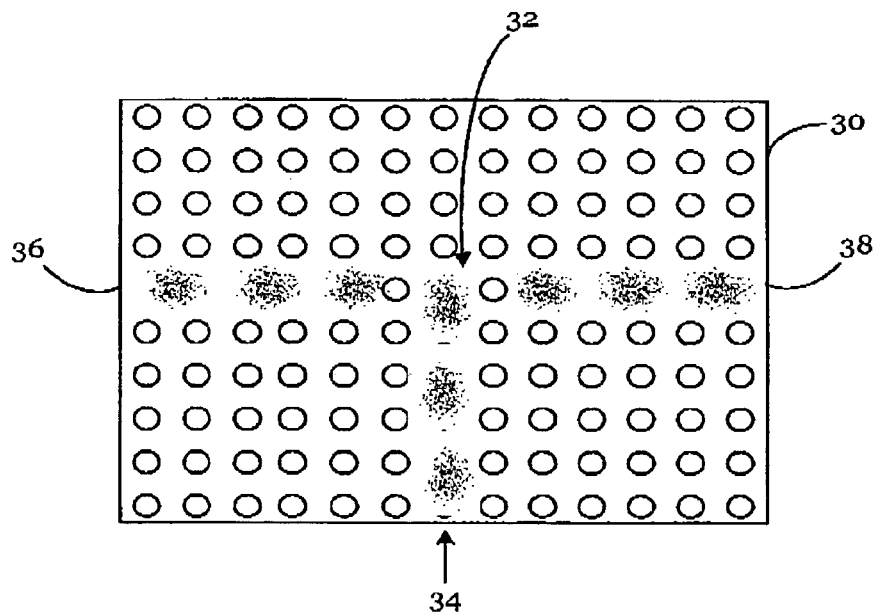
FIGURE 3
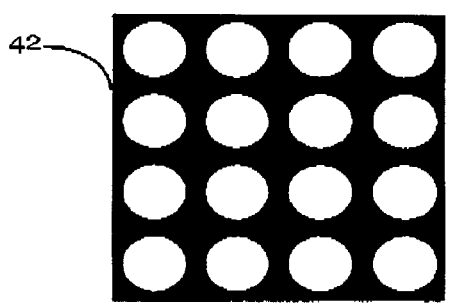 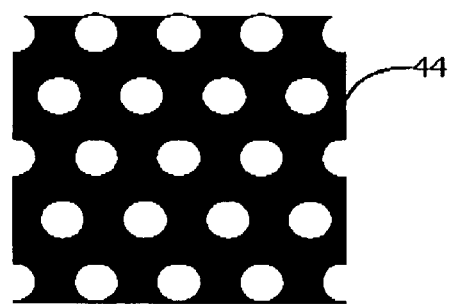
FIGURE 4(A)   FIGURE 4(B)

PHOTONIC ANALOG-TO-DIGITAL CONVERTERS USING PHOTONIC CRYSTALS

FIELD OF THE INVENTION

The invention relates generally to systems and methods for quantizing photonic signals and, more specifically, to systems and methods for analog-to-digital conversion of photonic signals.

BACKGROUND

An analog-to-digital converter is a ubiquitous component found in many different types of systems, such as but certainly not limited to computer, data, control, sensor, communication, and telecommunication systems. The analog-to-digital converters receive analog signals and provide a digital signal to another component, such as a processor. As the systems within which the analog-to-digital converters are used develop and become more sophisticated, the performance of the analog-to-digital converter is becoming more important.

For instance, as the development of a software defined radio continues, the need for high-speed analog to digital conversion to directly digitize RF to microwave signals rather than to down-converting the signal to IF becomes necessary to improve performance, to simplify design, to reduce noise, to reduce interference, and to reduce cost. The current technology of analog to digital conversion is primarily done at the electronic signal. The high speed sampling of the electronic signal has been limited to the stability of the clock jitter, thermal noise of the electronics, electromagnetic interference of other electronic devices and circuits, cross-talk, and coupling noises of interconnect lines.

The use of an optical signal has benefited many high speed communication applications due to the inherent inertness of the optical signals to the EMI noise and minimal cross-talk and coupling to close by devices. Optical signals can also travel relatively long distances without compromising severe signal distortion and attenuation at high modulation speed.

To obtain even better performance, some work has been done in performing the analog-to-digital conversion in the optical domain. a photonic analog-to-digital converter can take advantage of the high speed analog signal of the optical domain and convert it to a high speed digital signal in the electronic domain for further signal processing. The photonic analog-to-digital converter can therefore achieve high speed analog to digital conversion beyond today's technology. The photonic analog-to-digital converter can provide a system with the low noise, low distortion, and high-speed characteristic of photonics while leveraging the more established high-speed digital electronics for low cost signal processing. The digital signal is also less sensitive to noise and can be processed using today's semiconductor technology at relatively high speed.

FIG. 1 illustrates an example of a photonic analog-to-digital converter 10 using a conventional optical splitter 12, saturable absorbers 14, optical delay lines 16, photo-diode detectors 17 and electronic comparators 19. With this analog-to-digital converter, incoming photonic signals are split into a plurality of photonic components and directed toward the saturable absorbers 14. The saturable absorbers 14 quantize the photonic signal by preventing any signal from reaching the photo-diode detectors 17 unless the photonic components exceed a certain threshold level. The comparators 19 then digitize the output by comparing the output of the photo-diode detectors 17 to a reference level for the digital signal. A digital encoder 18 combines the individual bits from the comparators to form a digital signal.

A problem with this approach is that the use of conventional optical waveguides 16 and/or fiber splitter 12 makes it difficult to miniaturize the analog-to-digital converter 10. This is due to the minimum-bending radius allowed in order to minimize the scattering losses at the bends of the waveguides 16 and splitter 12. Secondly, the use of saturable absorbers 14 to quantize the optical signal creates a highly inefficient conversion. Most of the original optical signal will be wasted through absorption. As number of optical split channels required for the number of digital bit resolution is channels=$2^n$ bits, the device 10 quickly becomes impractical to implement.

SUMMARY

The invention addresses the problems above by providing systems and methods for quantizing photonic signals. A system according to a preferred embodiment has a photonic crystal with a periodic structure that forms a plurality of optical splitters and waveguides. The photonic signal passes through the photonic crystal and is separated into a plurality of quantized photonic components through the optical splitters. The quantized photonic components are then routed to a plurality of optical detectors for generating a set of electrical signals. The periodic structure of the photonic crystal also forms waveguides for routing the photonic signal through the various optical splitters and also for routing the quantized photonic components to the optical detectors.

In one embodiment, the system forms a photonic analog-to-digital converter. The splitters divide the photonic signal into successively smaller quantized photonic components each of which represents a different bit within a digital output. According to one aspect, the quantized photonic components are directed to optical limiters which pass the quantized photonic components to the optical detectors only if the quantized photonic components exceed a certain threshold intensity. According to another aspect, the quantized photonic components are routed to the optical detectors and a set of comparators forms individual bits of a digital signal by comparing outputs of the optical detectors to a set of intensity thresholds. An encoder forms the digital signals by combining the individual bits derived from each detector.

Because the analog-to-digital conversion is performed optically, the analog-to-digital converter can operate at much higher speeds and is much less susceptible to EMI, cross-talk, and noise. Also, since the routing and splitting of the photonic signals is performed within the crystal and not with conventional fiber waveguides and/or splitters, the analog-to-digital converter can be manufactured much smaller and can more easily accommodate higher of bits. The analog-to-digital converters according to the invention therefore offer a more beneficial and practical solution to analog-to-digital conversion and with improved overall performance.

Other advantages and features of the invention will be apparent from the description below, and from the accompanying papers forming this application.

BRIEF DESCRIPTION OF DRAWINGS

The accompanying drawings, which are incorporated in and form a part of the specification, illustrate preferred embodiments of the present invention and, together with the description, disclose the principles of the invention. In the drawings:

FIG. 3 is an example of a splitter using a crystal according to an embodiment of the invention;

DETAILED DESCRIPTION

Figure 1:
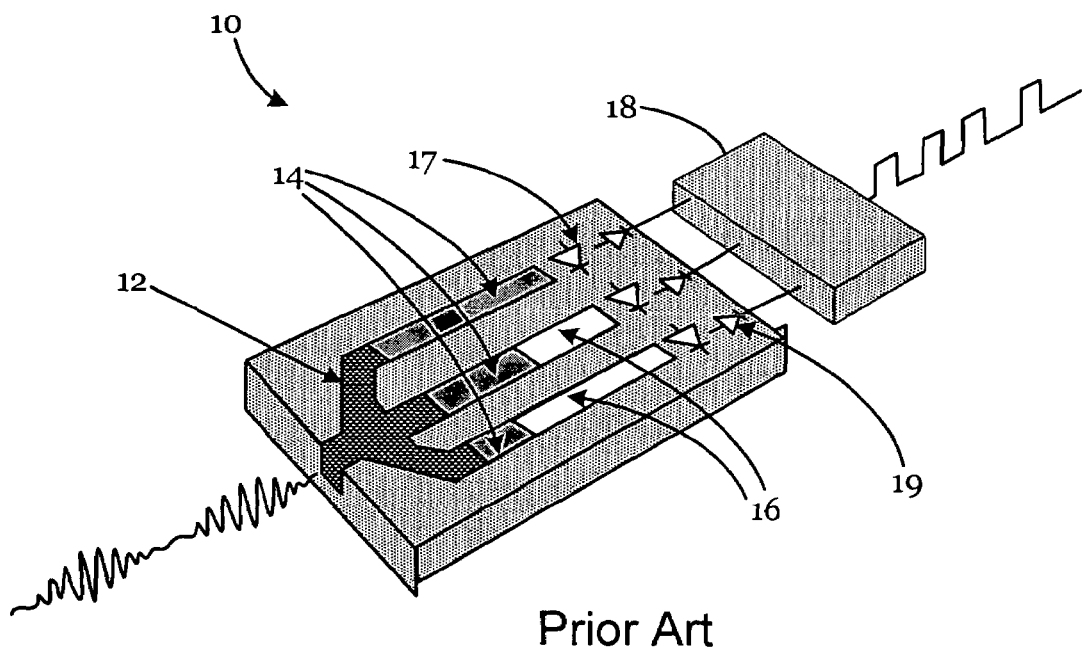
FIG. 1 is a diagram of a conventional photonic analog-to-digital converter using saturable absorbers.
Figure 2:
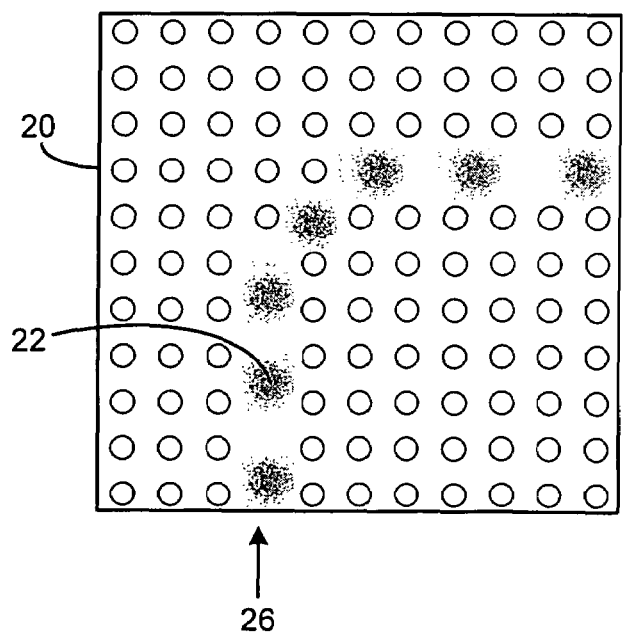
FIG. 2 is an example of a waveguide using a crystal according to an embodiment of the invention.

In recent years, a photonic crystal has been studied for creating optical waveguides. Unlike conventional index confined waveguides, photonic crystals guide the optical waves by prohibiting certain energy states within certain frequency ranges to exist within the periodic structure. As a result, the electromagnetic waves can be guided through tight bends without any significant scattering losses. FIG. 2 is a diagram that represents the path 26 of travel of a photonic signal 22 through a crystal 20. The photonic crystal 20 enables smaller optical devices to be interconnected than can be achieved through conventional optical waveguides and/or fibers. FIG. 3 is a diagram of a photonic crystal 30 that forms a splitter 32 for separating an incoming photonic signal 34 into two photonic components 36 and 38. The photonic crystal 30 has the ability to create a highly efficient optical splitter 32 close to 100% transmission over certain frequency range.

Figure 4C:
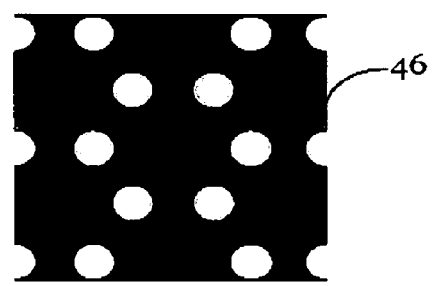
FIGS. 4(A), (B), and (C) are examples of different periodic pattern structures for photonic crystals.

The photonic crystals according to the invention have periodic dielectric structures that contain materials with alternating different dielectric constants. As shown in FIGS. 4(A) to 4(C), the periodic structures can form square 42, triangular 44, honeycomb 46, or other patterns for creating a photonic bandgap used in confining electromagnetic waves within the localized defect region. Additional information on photonic crystals may be found in M. Loncar et al., Applied Physics Letters, Vol. 77, No. 13, Sep. 25, 2000, and M. Bayindir et al., Applied Physics Letters, Vol. 77, No. 24, Dec. 11, 2000, both of which are incorporated herein by reference.

Figure 5:
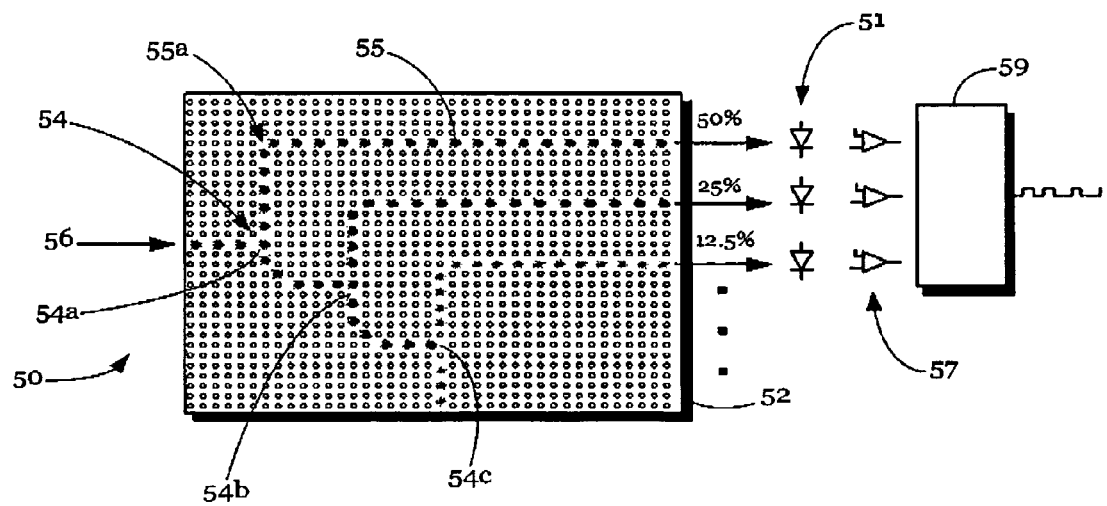
FIG. 5 is a diagram of a photonic analog-to-digital converter according to an embodiment of the invention.

An optical signal quantizer 50 will now be described with reference to FIG. 5. The quantizer 50 has a photonic crystal 52 which defines a highly efficient optical splitter 54 and optical waveguide 55 bends at sub-micron radii. The quantizer 50 includes a plurality of optical splitters 54a to 54c for successively splitting an incoming photonic signal 56 into smaller quantized photonic signals. In this example, each optical splitter 54 separates a photonic signal into two equal photonic signals. It should be understood that in other embodiment of the invention, the splitters 54 could separate a photonic signal into more than two photonic signals and/or may separate a photonic signal into unequal photonic signals. With reference to FIG. 5, the incoming photonic signal is separated into two photonic signals quantized at 50% for each signal. The second optical splitter 54b receives one of the 50% quantized photonic signal and divides the signal in half to form two 25% quantized photonic signals. Finally, the third optical splitter 54c receives one of the 25% quantized signals and forms two 12.5% quantized optical signals.

The outputs from the optical splitters 54 are routed through waveguides 55 to optical detectors 51. The waveguides 55 preferably are designed to provide a uniform delay for all quantized photonic signals. Thus, each quantized photonic signal of the incoming photonic signal will reach the optical detectors 51 at the same time. The waveguides 55 include turns, such as 90 degree turns 55a, which may be provided with practically no losses. The quantized photonic signals are then converted into electrical signals by the optical detectors 51. A set of comparators 57 set threshold levels for the digital signals and provide outputs in digital form. The outputs from the comparators 57 forms individual bits of the digital signal which are combined together through digital encoder 59. Thus, with the quantizer 50, the photonic crystal 52 quantizes the incoming photonic signal 52 into quantized photonic signals by successively splitting the photonic signal. With the high-speed photodiode detectors 51, comparators 57, and the digital encoder 59, the quantizer 50 can provide a high-speed optical analog to digital converter.

In the embodiment shown in FIG. 5, the analog signals from the optical detectors 51 are input to the comparators 57 in order to form the digital bits of a digital signal. With this embodiment, the analog electrical signals are compared to threshold levels set by the comparators 57. According to another aspect of the invention, the quantized photonic signals are compared to threshold intensity levels, thereby resulting in an even faster conversion speed. The comparison of the quantized photonic signals can be performed in a number of ways, such as through the use of an optical limiter. According to this aspect, a photonic crystal quantizes photonic signals and routes the quantized signals directly to the optical limiter. The output of the optical limiter is provided to photodiodes and then to a digital encoder. This approach eliminates any analog signal in the electrical domain. The use of a non-linear distributed feedback structure as an optical limiter can remove the use of the electronic comparators 57 in the photonic analog-to-digital system 50 of FIG. 5. Additional information on optical limiters may be found in L. Brzozowski et al., IEEE Journal of Quantum Electronics, Vol. 36, No. 5, May 2000, which is incorporated herein by reference.

Figure 6:
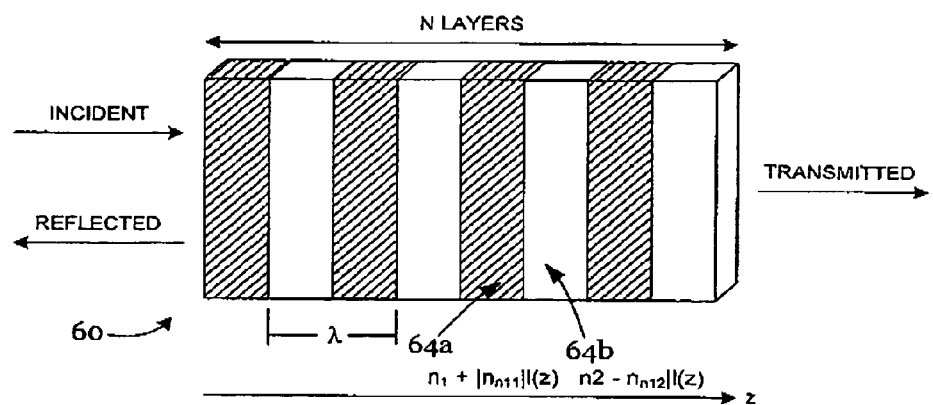
FIG. 6 is a diagram of an optical limiter structure using alternating dielectric and optical Kerr coefficients.

An example of an optical limiter 60 will now be described with reference to FIG. 6. The optical limiter 60 is comprised of a one-dimensional periodic structure 62 with alternating dielectric constants 64a and 64b which possesses alternating positive and negative non-linear Kerry coefficients This structure can provide an optical hard-limited effect that prevents light transmission up to certain intensity level and quickly switches to a fixed limit of output transmission after the certain intensity threshold is reached. The threshold can be determined by the selection of the alternating material dielectrics and their corresponding Kerr coefficients. The thresholds for the optical limiters may be set to the same value or to different values. The wavelength $\lambda$ of operation can be tuned by changing the layer thickness and spacing. The shape quality of the optical signal response curve can be determined by the number of alternating layers.

Figure 7:
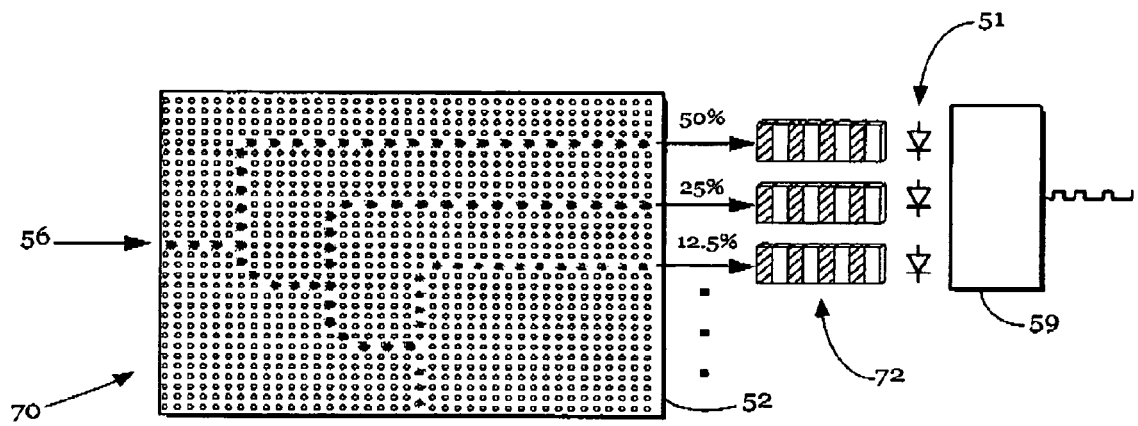
FIG. 7 is a diagram of a photonic analog-to-digital converter according to another embodiment of the invention using an optical limiter.

FIG. 7 is a diagram of a quantizer 70 according to another embodiment of the invention. The quantizer 70 includes the photonic crystal 52 which receives the incoming photonic signal 56 and forms quantized photonic signals. The quantized photonic signals are passed through optical limiters 72 which block the quantized photonic signal if it is less than a set threshold intensity level or passes the quantized photonic signal if it meets or exceeds the threshold intensity level. The set of optical detectors 51 receives the outputs from the optical limiters 72 and outputs from the detectors 51 form the individual bits of a digital signal. The digital encoder 59 forms the digital signal from the individual bits.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What we claim:

1. A system for quantizing a photonic signal, comprising:
   a photonic crystal for receiving the photonic signal;
   the photonic crystal having a periodic structure for directing the photonic signal through the photonic crystal;
   the periodic structure within the photonic crystal forming at least one splitter for separating the photonic signal into a first quantized photonic signal and a second quantized photonic signal;
   a first waveguide formed by the periodic structure within the photonic crystal for receiving the first quantized photonic signal from the at least one splitter, wherein the first waveguide is capable of providing a uniform delay for the first quantized photonic signal;
   a second waveguide formed by the periodic structure within the photonic signal for receiving the second quantized photonic signal form the at least one splitter, wherein the second waveguide is capable of providing a uniform delay for the second quantized photonic signal;
   a first optical detector for receiving the first quantized photonic signal from the first waveguide and for generating a first quantized electrical signal; and
   a second optical detector for receiving the second quantized photonic signal from the second waveguide and for generating a second quantized electrical signal.

2. The system as set forth in claim 1, wherein:
   the periodic structure within the photonic crystal forms a first splitter and a second splitter;
   the first splitter for receiving the photonic signal and for separating the photonic signal into a third quantized photonic signal and a fourth quantized photonic signal;
   the second splitter for receiving the fourth quantized photonic signal from the first splitter and for separating the fourth quantized photonic signal into the first quantized photonic signal and the second quantized photonic signal;
   a third waveguide formed by the periodic structure within the photonic signal for receiving the third quantized photonic signal from the first splitter, wherein the third waveguide is capable of providing a uniform delay for the third quantized photonic signal;
   the system further comprising a third optical detector for receiving the third quantized photonic signal from the third waveguide and for generating a third quantized electrical signal.

3. The system as set forth in claim 2, wherein the first splitter separates the photonic signal so that the third and fourth quantized photonic signals each has one half a magnitude of the photonic signal.

4. The system as set forth in claim 1, wherein the photonic crystal includes a waveguide formed by the periodic structure for guiding the photonic signal to the at least one splitter.

5. The system as set forth in claim 1, further comprising:
   a first comparator for generating a first digital output if the first quantized photonic signal exceeds a first threshold level; and
   a second comparator for generating a second digital output if the second quantized photonic signal exceeds a second threshold level;
   the first digital output and the second digital output representing different quantum magnitudes.

6. The system as set forth in claim 5, further comprising a digital encoder for combining the first digital output and the second digital output to form a digital electrical signal.

7. The system as set forth in claim 1, further comprising:
   a first optical limiter for receiving the first quantized photonic signal;
   the first optical limiter passing the first quantized photonic signal to the first optical detector only if an intensity of the first quantized photonic signal exceeds a first threshold; and
   a second optical limiter for receiving the second quantized photonic signal;
   the second optical limiter passing the second quantized photonic signal to the second optical detector only if an intensity of the second quantized photonic signal exceeds a second threshold.

8. The system as set forth in claim 7, wherein:
   the first optical detector generates the first quantized electrical signal as a first digital output if the first quantized photonic signal exceeds the first threshold; and
   the second optical detector generates the second quantized electrical signal as a second digital output if the second quantized photonic signal exceeds the second threshold;
   the first digital output and the second digital output representing different quantum magnitudes.

9. The system as set forth in claim 8, further comprising a digital encoder for combining the first digital output and the second digital output to form a digital electrical signal.

10. A photonic analog-to-digital converter, comprising:
    a photonic crystal for receiving a photonic signal;
    the photonic crystal having a periodic structure for directing the photonic signal through the photonic crystal;
    the periodic structure within the photonic crystal forming a plurality of splitters;
    a first splitter for separating the photonic signal into a first quantized photonic signal and a second quantized photonic signal;
    a second splitter for separating the second quantized photonic signal into a third quantized photonic signal and a fourth quantized photonic signal;
    a third splitter for separating the fourth quantized photonic signal into a fifth quantized photonic signal and a sixth quantized photonic signal;
    a first optical detector for receiving the first quantized photonic signal and for generating a first quantized electrical signal;
    a second optical detector for receiving the third quantized photonic signal and for generating a second quantized electrical signal; and a third optical detector for receiving the fifth quantized photonic signal and for generating a third quantized electrical signal;

wherein the periodic structure within the photonic structure further forms:

a first waveguide for guiding the photonic signal to the first splitter;

a second waveguide for guiding the first quantized photonic signal to the first optical detector, wherein the second waveguide is capable of providing a uniform delay for the first quantized photonic signal;

a third waveguide for guiding the second quantized photonic signal to the second splitter, wherein the third waveguide is capable of providing a uniform delay for the second quantized photonic signal;

a fourth waveguide for guiding the third quantized photonic signal to the third optical detector, wherein the fourth waveguide is capable of providing a uniform delay for the third quantized photonic signal;

a fifth waveguide for guiding the fourth quantized photonic signal to the third splitter, wherein the fifth waveguide is capable of providing a uniform delay for the fourth quantized photonic signal; and a sixth waveguide for guiding the fifth quantized photonic signal to the third optical detector, wherein the sixth waveguide is capable of providing a uniform delay for the fifth quantized photonic signal;

the first, second, and third quantized electrical signals forming a digital signal.

11. The photonic analog-to-digital converter as set forth in claim 10, wherein each of the second, third, fourth, fifth, and sixth waveguides has a 90 degree turn.

12. The photonic analog-to-digital converter as set forth in claim 10, further comprising:

a first comparator for generating a first digital output if the first quantized electrical signal exceeds a first threshold level;

a second comparator for generating a second digital output if the second quantized electrical signal exceeds a second threshold level; and a third comparator for generating a third digital output if the third quantized electrical signal exceeds a third threshold level the first, second, and third digital outputs representing different quantum magnitudes.

13. The photonic analog-to-digital converter as set forth in claim 10, further comprising:

a first optical limiter for receiving the first quantized photonic signal;

the first optical limiter passing the first quantized photonic signal to the first optical detector only if an intensity of the first quantized photonic signal exceeds a first threshold;

a second optical limiter for receiving the second quantized photonic signal;

the second optical limiter passing the second quantized photonic signal to the second optical detector only if an intensity of the second quantized photonic signal exceeds a second threshold; and a third optical limiter for receiving the third quantized photonic signal;

the third optical limiter passing the third quantized photonic signal to the third optical detector only if an intensity of the third quantized photonic signal exceeds a third threshold.

14. A method of quantizing a photonic signal, comprising:

passing the photonic signal through a photonic crystal having a periodic structure;

the periodic structure forming a plurality of optical splitters and waveguides;

routing the photonic signal through the plurality of splitters;

forming a plurality of quantized photonic components from the outputs of the splitters;

routing the quantized photonic components through the waveguides within the photonic crystal, wherein the waveguides are capable of providing a uniform delay for the quantized photonic components;

directing the quantized photonic components to a plurality of optical detectors; and generating a plurality of electrical signals with the optical detectors.

15. The method of quantizing the photonic signal as set forth in claim 14, further comprising:

comparing the plurality of electrical signals with a respective plurality of thresholds; and generating bits of an electrical digital signal from the comparing of the plurality of electrical signals to the respective plurality of thresholds.

16. The method of quantizing the photonic signal as set forth in claim 14, further comprising:

passing the quantized photonic components to the optical detectors only if intensities of the quantized photonic components exceed a set of threshold levels; and generating bits of an electrical digital signal from outputs of the plurality of optical detectors.

17. The method of quantizing the photonic signal as set forth in claim 14, wherein passing the quantized photonic components comprises passing the quantized photonic components through an optical limiter.

* * * * *